US012465096B2

(12) United States Patent
Foroutanjazi et al.

(10) Patent No.: US 12,465,096 B2
(45) Date of Patent: Nov. 11, 2025

(54) STRAPLESS FACE MASK

(71) Applicants: Sina Foroutanjazi, Boston, MA (US); Shahla Bastar, Boston, MA (US)

(72) Inventors: Sina Foroutanjazi, Boston, MA (US); Shahla Bastar, Boston, MA (US)

( * ) Notice: Subject to any disclaimer, the term of this patent is extended or adjusted under 35 U.S.C. 154(b) by 889 days.

(21) Appl. No.: 17/350,030

(22) Filed: Jun. 17, 2021

(65) Prior Publication Data

US 2022/0400789 A1 Dec. 22, 2022

(51) Int. Cl.
*A41D 13/11* (2006.01)
*A62B 23/02* (2006.01)

(52) U.S. Cl.
CPC ........ *A41D 13/1176* (2013.01); *A62B 23/025* (2013.01)

(58) Field of Classification Search
CPC ................ A41D 13/11; A41D 13/1169; A41D 13/1176; A62B 23/025; A62B 18/025; A62B 18/084; A61M 16/0688; A61M 16/0611
See application file for complete search history.

(56) References Cited

U.S. PATENT DOCUMENTS 3,049,121 A * 8/1962 Brumfield ............ A62B 23/025 128/206.14
4,966,140 A * 10/1990 Herzberg ............... A42B 1/045 128/206.13
5,699,792 A 12/1997 Reese et al.
5,918,598 A 7/1999 Belfer et al.
6,196,223 B1 * 3/2001 Belfer ............... A61M 16/0688 128/206.25
6,948,499 B2 * 9/2005 Griesbach, III ... A41D 13/1161 128/206.25
7,083,849 B1 * 8/2006 Albrecht ............... B29C 55/005 428/317.1
7,152,601 B2 12/2006 Barakat et al.
8,118,026 B2 2/2012 Gebrewold et al.
D677,779 S 3/2013 Turdjian et al.
9,605,181 B2 * 3/2017 Lu .............................. C09J 7/00
D803,391 S 11/2017 Reese et al.
10,674,776 B2 6/2020 Matich
D905,351 S 12/2020 Zheng
2002/0104543 A1 * 8/2002 Hollander ............ A62B 23/025 128/206.25

(Continued)

FOREIGN PATENT DOCUMENTS

EP 0355444 B1 12/1992
WO WO-2016025266 A1 * 2/2016 ......... A41D 13/1169

*Primary Examiner* — Brandy S Lee
*Assistant Examiner* — Mishal Zahra Hussain
(74) *Attorney, Agent, or Firm* — Wilmer Cutler Pickering Hale and Dorr LLP

(57) ABSTRACT

Embodiments for a strapless facemask are disclosed. In a non-limiting embodiment, the strapless facemask includes a mask body made of a filtering material having an inner, skin-facing surface and an outer surface. A flexible stalk is provided having an end attached to the mask body and another end attached to an adhesive pad. The stalk is disposed along a peripheral portion of the mask body to extend in a first direction away from the inner surface of the mask body. The adhesive pad may have a width greater than a width of the stalk in a direction perpendicular to the first direction.

25 Claims, 6 Drawing Sheets

(56) References Cited

U.S. PATENT DOCUMENTS

| | | | | |
|---|---|---|---|---|
| 2006/0230485 | A1* | 10/2006 | Lee | A41D 13/1138 2/15 |
| 2008/0110469 | A1* | 5/2008 | Weinberg | A41D 13/1176 128/206.25 |
| 2015/0289573 | A1 | 10/2015 | Haas | |

* cited by examiner

STRAPLESS FACE MASK

FIELD OF THE DISCLOSURE

Embodiments of the disclosure relate to a strapless face mask. In some non-limiting implementations, the disclosure relates to a strapless face mask that is configured to adhere to a user's facial contours while being flexible to allow for maintained comfort and usability.

BACKGROUND OF THE DISCLOSURE

Medical masks were made and worn in the 1900s by surgeons who believed their oral secretions and bacteria could infect wounds. Early masks included a piece of gauze that was wrapped around the head with a band to prevent it from falling. Although different types of masks have been developed to protect people from infectious or harmful substances, the design of protective masks has not changed too dramatically from their inception 200 years ago. The overall structure of the mask still includes a piece of cloth covering the user's mouth and/or nose, attached to one or more bands that are wrapped around the user's head or ears or tied into a knot behind the head.

Current mask designs are difficult to wear for prolonged periods of time, which is a factor for medical professionals and personnel or other frontline workers encountering sick people. Improper fitting techniques and the need to apply pressure against the mask for generating a proper seal has resulted in consumer dissatisfaction with current designs and has caused dermatological skin injuries of those who wear masks for several hours every day. The overall discomfort and dermatological burdens have been shown to reduce compliance with mask use, which places users and those around them at risk of contracting diseases. The one-size-fits-all design of current masks often disregards variations in anatomical facial structures within the population, exacerbating the risk of people opting to not wear masks or at least lowering the masks' efficiency.

SUMMARY OF THE DISCLOSURE

Embodiments of a strapless face mask are disclosed. A mask body is provided that includes an inner, skin-facing surface and an outer surface. The mask body is made of a filtering material. A flexible stalk is disposed along a peripheral portion of the inner surface to extend away from the mask body. An adhesive pad is fixed to an end of the stalk and extends along the peripheral portion with the stalk. The adhesive pad may have a width greater than a width of the stalk.

In some embodiments, the mask body may be made of an N95 material or bilayer surgical fiber. The material can be selected to match a level of filtering required. The mask body may have plications that extend horizontally with respect to a user's face. In some embodiments, the mask body may have a bowed shape particularly when the mask is in a fully expanded position, creating increased breathing space for a user.

The adhesive pad may have microplications formed of peaks and troughs on a skin-facing side to facilitate adhesion to an uneven surface of a user's face. The stalk may be flexible to allow the mask body to move when being worn. The stalk may have various shapes, such as a corrugated shape, an accordion shape, or the like. In some embodiments, the stalk may act as an adjustable spacer distancing the mask body from a user's face. An appendage may be attached to the outer surface of the mask body for a user to grasp when adjusting the mask. In some embodiments, the appendage is sewn to the outer surface of the mask body.

These and other aspects of the disclosed subject matter will be more fully understood with reference to the following figures, detailed description, and claims. It is to be understood that the terminology employed herein are for the purpose of description and should not be regarded as limiting.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

Various objectives and features of the disclosed subject matter can be more fully appreciated with reference to the following detailed description of the enclosed subject matter when considered in connection with the following drawings, in which like reference numerals identify like elements. The following drawings should not be construed as limiting the present disclosure and are intended to be illustrative only.

DETAILED DESCRIPTION OF EMBODIMENTS

Figure 1:
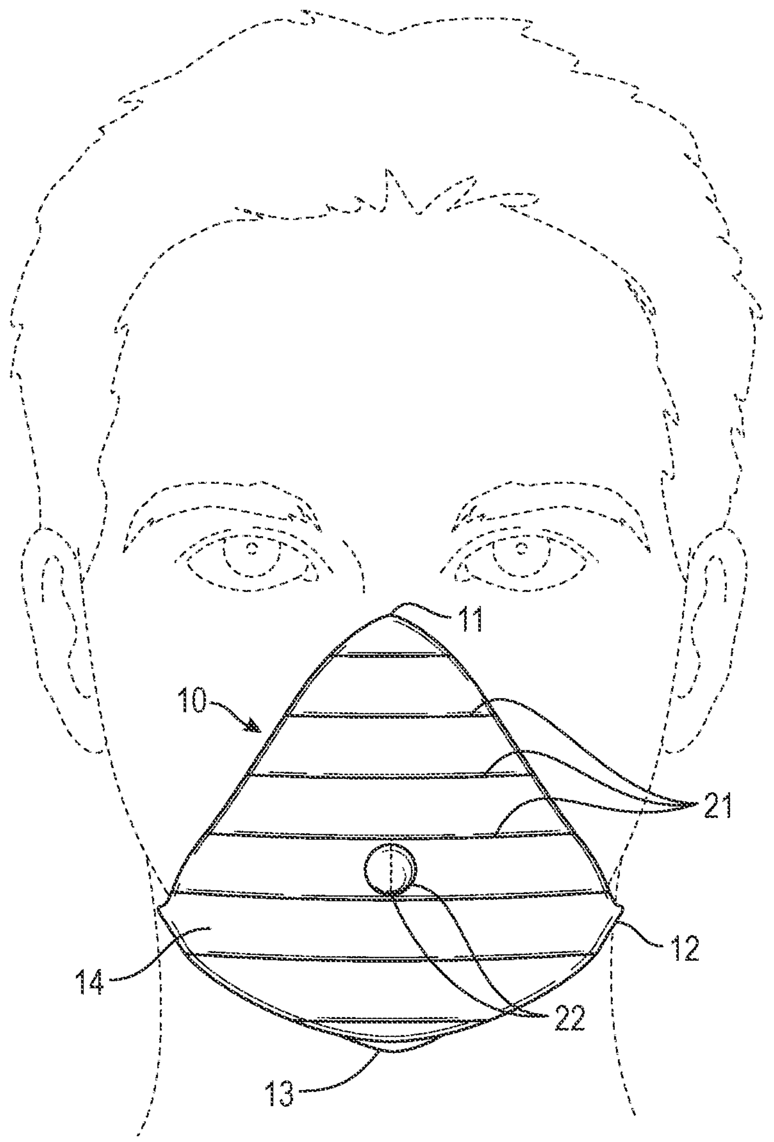
FIG. 1 illustrates a front view of a face mask according to a non-limiting embodiment of the present disclosure.

FIG. 1 illustrates a strapless face mask 10 worn over the nose and mouth according to an exemplary embodiment. The face mask 10 includes one or more filtering layers 14 made of a respiratory filter material, such as a mesh of synthetic polymer fibers, which may be in the form of a polypropylene fabric like that used for N95 masks to trap particles. The filtering layer 14 may also be a bilayer surgical fiber covered with cloth. The lack of straps or other ways for engaging a user's ears to secure the mask increases comfort and adjustability, while reducing weight. The strapless configuration also eases burden on the back of the head and neck as well as the sides of the face, which in addition to reducing contact and pressure on the skin, provides enhanced comfort over prolonged periods of use. Further, the light design of the face mask 10 allows for suspension over the face, rather than the mask being compressed against the face with a strap, which reduces pressure on the skin and bony prominences of the face, including the nose and the cheeks. The face mask 10 can be mounted on the ridge of the user's nose to provide additional support for aiding the suspension. Also, the strapless design allows users to wear the face mask 10 faster, as the need to tie knots or otherwise position a strap may be eliminated.

The filtering layer 14 of the mask may have horizontal plications 21 that allow the mask 10 to expand and contract. Additionally or alternatively, the mask may similarly have plications (not shown) oriented vertically or in other directions. When the mask 10 is fully collapsed, the plications 21 allow the mask to be in a compact form both in depth and height. As an example, the plications 21 may be located at 0.5 cm intervals (peak to peak distance when fully expanded) but tightly packed when fully collapsed. The thickness of the filtering layer 14 may be approximately 1-1.5 cm, for example, when fully collapsed, which can become effaced when the mask 10 is expanded for use.

Figure 2A:
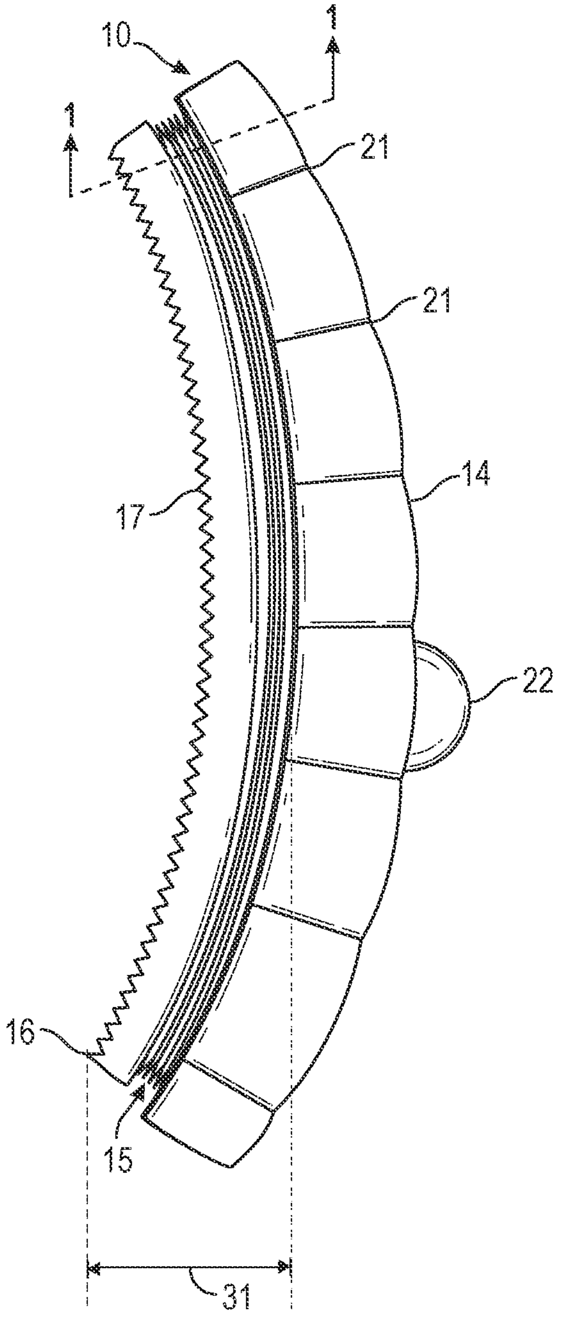
FIG. 2A illustrates a side view of a face mask with a stalk in a collapsed position according to a non-limiting embodiment of the present disclosure.
Figure 2B:
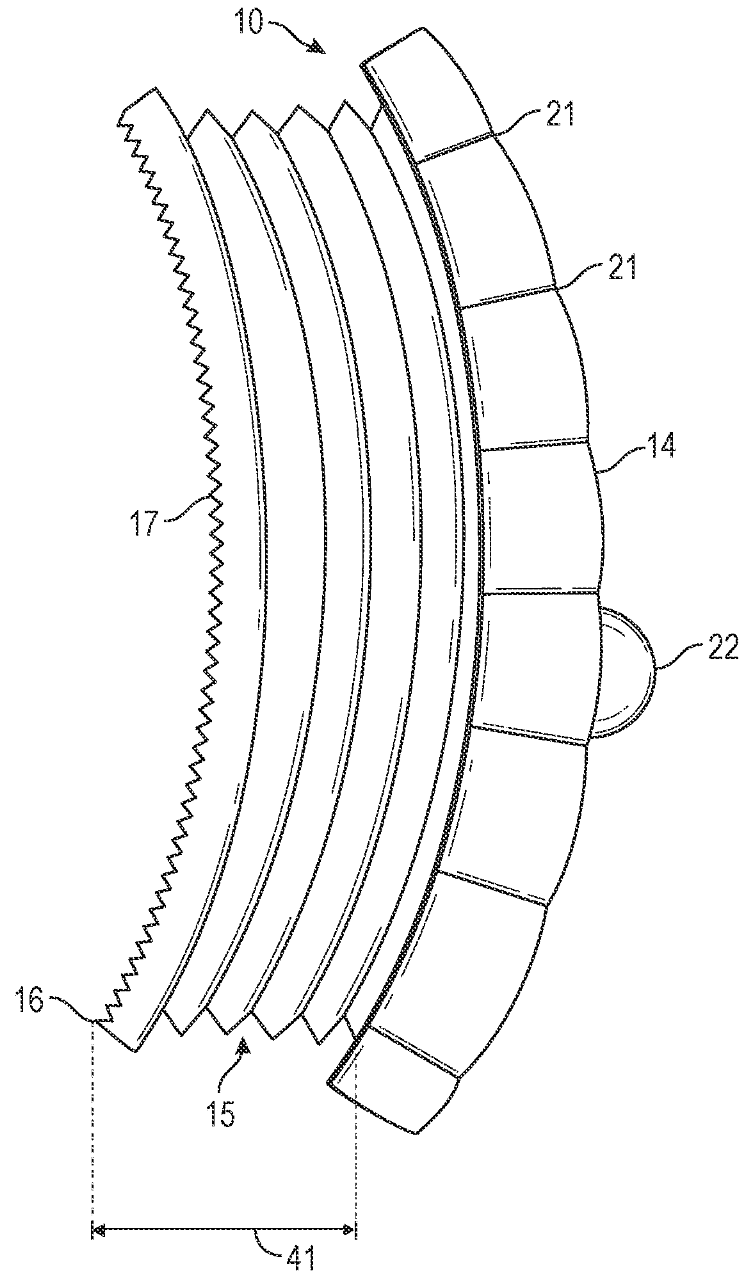
FIG. 2B illustrates a side view of a face mask with the stalk in an expanded position according to a non-limiting embodiment of the present disclosure.

With additional reference to FIGS. 2A and 2B, the mask 10 has an appendage 22 on the filtering layer 14 to facilitate adjustment. In a non-limiting embodiment, the appendage 22 may be soft, flexible, and made of a circular piece of material, which could be the same material used for the filtering layer 14 or a stalk 15 that is discussed below in more detail. As an example, the appendage 22 may be 1.5 cm in diameter. The appendage 22 may be attached to the filtering layer 14 by being sewn along its central diameter in a vertical fashion, as shown in FIG. 1, to form two semicircles resembling a duck's bill that are folded onto themselves before the mask 10 is expanded for use. The user can pull the filtering layer 14 of the mask 10 forward using the appendage 22, by grasping one or both semicircles, after donning the mask 10. Besides improving adjustment of the mask 10, this will further bring out the bowing of the mask 10 as well, increasing breathing space.

Of course, the shape, materials, design, and location of the appendage 22 are not limited to those described above. Moreover, more than one appendage 22 may be used. For example, two appendages may be used, one located towards the right side of the mask 10 and one located towards the left side of the mask 10 to better accommodate both left- and right-handed users. One of ordinary skill in the art, upon reading the present disclosure, would readily understand a variety of ways to incorporate one or more appendages into the design of the mask 10.

Figure 3:
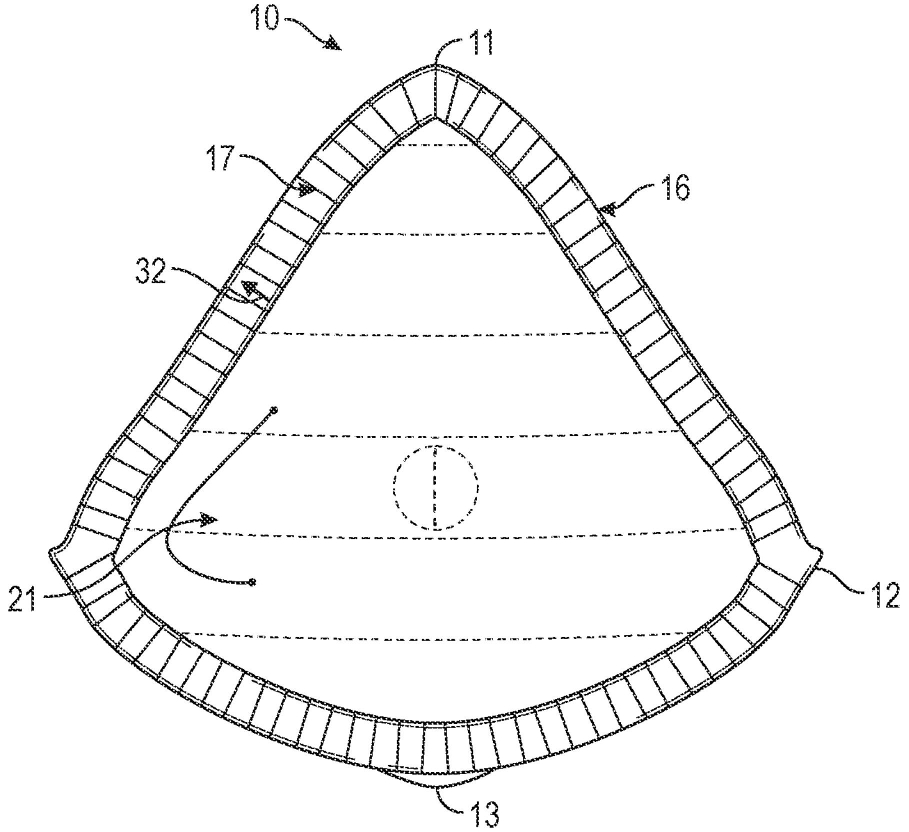
FIG. 3 illustrates a rear view of a face mask according to a non-limiting embodiment of the present disclosure.
Figure 4:
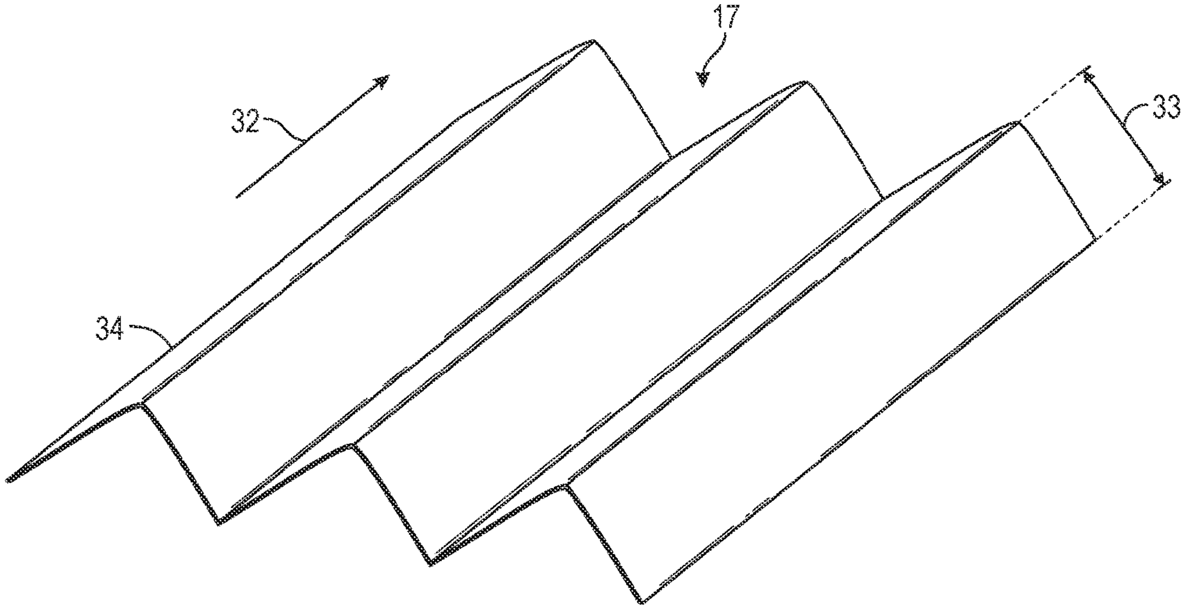
FIG. 4 illustrates a closeup view of an adhesive pad of a face mask according to a non-limiting embodiment of the present disclosure.

With additional reference to FIG. 3, in one implementation, an adhesive pad 16 runs along an inside perimeter of the mask 10 to form a seal with the user's face. In a non-limiting embodiment, the adhesive pad 16 extends along an inside perimeter to surround an area defined by an upper portion 11 of the mask 10 covering the ridge of the nose, side borders 12 that extend from the upper portion 11 around corners of the user's lip, and a lower border 13 covering the chin. The side of the adhesive pad 16 in contact with the user's face may be initially covered with a release paper (not shown) that can be peeled off before the mask 10 is sealed to the face. This release paper prevents the mask 10 from being contaminated before contacting the user's face. The adhesive pad 16 may be made from a medical grade material with a skin-friendly adhesive material. On the side in contact with the face, the adhesive pad 16 has microplications 17 that may extend in radial directions 32 perpendicular to the perimeter of the mask. It will be appreciated that the microplications 17 can additionally or alternatively extend in other directions depending on the configuration. With additional reference to FIG. 4, the microplications 17 may respectively have triangular shapes with sides 34 that extend in radial directions 32. As an example, the sides 34 of the microplications 17 may have lengths of 1-2 cm in the radial directions 32 and widths 33 of 1-2 mm. The microplications 17 and their associated adhesive may therefore form wave or sawtooth like patterns with distances between peaks of the microplications 17, for example, being between 0.25-2 mm. The positioning of the microplications 17 allows for two-dimensional adjustment of the adhesive pad 16 with respect to the non-uniform surface of the skin. Accordingly, the microplications 17 increase mobility of the adhesive pad 16 on uneven surfaces of the user's face, thereby increasing adjustability of the adhesive pad 16. As a result, the entire face mask 10 can be adjusted on the user's skin before the mask 10 is finally pressed into place to provide a suitable fit and increased comfort.

Figure 5:
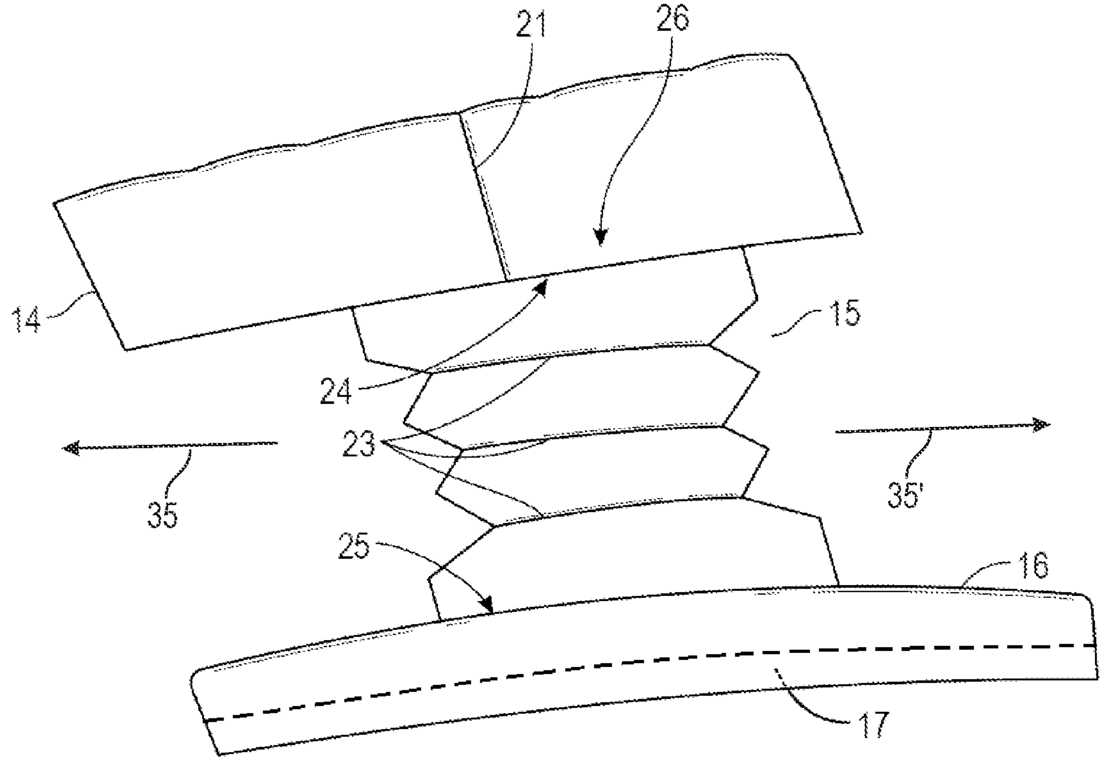
FIG. 5 illustrates a sectional view of a face mask taken along the lines 1-1 of FIG. 2A according to a non-limiting embodiment of the present disclosure.

FIG. 5 shows a sectional view of the perimeter of the mask 10 taken along the lines 1-1 of FIG. 2A and provides a close-up view of a stalk 15. The stalk 15 is positioned between the adhesive pad 16 and the filtering layer 14. A first end 24 of the stalk 15 is attached to the filtering layer 14, and a second end 25 of the stalk 15 is attached to the adhesive pad 16. Although FIG. 5 shows the stalk 15 being directly connected to the filtering layer 14 and the adhesive pad 16, the first end 24 of the stalk 15 may be indirectly connected to the layer 14, such that there are one or more intervening components (not shown) between the end 24 and the layer 14. Similarly, the second end 25 of the stalk 15 may be indirectly connected to the pad 16, such that there are one or more intervening components (not shown) between the end 25 and the pad 16. Furthermore, in another embodiment, the first end 24 of the stalk 15 may be integral with filtering layer 14 and/or the second end 25 of the stalk 15 may be integral with the adhesive pad 16, such that there are one or more intervening components (not shown) between the end 25 and the pad 16. In one non-limiting embodiment, the stalk 15 can expand in an anterior-posterior fashion with respect to the user's face. Moreover, by acting as a spacer between the filter layer 14 and the user's face, the stalk 15 may increase the total volume that the user can inhale at any aspiration, hence increasing comfort. As shown, the second end 25 of the stalk 15 is attached to the side of the adhesive pad 16 that does not contact the user's face. In a non-limiting implementation, this attachment may be accomplished using an adhesive or suitable bonding material. In another non-limiting embodiment, the stalk 15 and adhesive pad 16 may be molded as a unitary body. As shown in FIG. 5, the stalk 15 is narrower than the adhesive pad 16. Because the stalk has a narrower width than the adhesive pad, the face mask 10 has a unique structural configuration that reduces weight and provides structural benefits. For example, given that the mask 10 can pivot at the point of attachment to the face due to gravity, the narrow stalk 15 mechanically helps reduce the risk of dissociation of the mask from the user's face, resulting in maintenance of an optimal seal. Also, the light design of the narrow stalk 15 minimizes pulling on the skin and results in a decreased chance of sagging of the skin with prolonged use. As a non-limiting example, the adhesive pad 16 may be between 20-30 mm wide whereas the stalk may range from 10 to 15 mm. The stalk 15 may be made, for example, of a fully impermeable material, an N95 quality fiber, or the like, which is moldable yet strong. The stalk 15 may have a semi-rigid structure that is impermeable to air and particles. Although FIG. 5 shows the stalk 15 narrower than the pad 16, in other embodiments, the stalk 15 may have the same width as the pad 16. In yet other embodiments, the stalk 15 may be wider than the pad 16.

Alternatively, in a non-limiting embodiment, the stalk 15 may allow air to pass while providing a filtering function. As shown in FIG. 5, air or carbon dioxide may pass through the stalk 15 in directions 35 and 35' depending on whether the user is inhaling or exhaling while simultaneously performing the filtering function. While the directions 35 and 35' show the air and carbon dioxide flow in a horizontal direction, it will be appreciated that the air and carbon dioxide flow can enter and leave the stalk 15 at different angles and in different directions. The natural pores of the fiber in the permeable embodiment of the stalk 15 provide filtration. The same filter material used for the filtering layer 14 may be used for the stalk 15. Alternatively, a different type of material that provides a suitable filtering function may be used for the stalk 15. The stalk 15, like the adhesive pad 16, forms a continuous circumferential band along the perimeter of the mask 10. In a non-limiting embodiment, the stalk 15 is sewn to the filtering layer 14. Alternatively, the stalk 15 can be pressed and sealed to the filtering layer 14. Connection points between the stalk 15 and the filtering layer 14, and between the stalk 15 and adhesive pad 16, may be strong enough to prevent penetration of air and particles.

FIG. 5 illustrates plications 23, which may be horizontal, to provide the stalk 15 with an accordion-like structure. Additionally or alternatively, the plications 23 may be oriented in other directions. The stalk 15 acts as a spacer between the adhesive pad 16 and the filtering layer 14, allowing the mask 10 to remain sealed to the user's face even when the user moves her or his face and breathes out. As a non-limiting example, the stalk may be between 2-2.5 centimeters when collapsed and 4-5 centimeters when fully expanded to maximize breathing space. The stalk 15 may be soft enough to be adjusted but rigid enough to hold position after adjustment. Thus, the stalk 15 can be set to a particular length without substantially springing in either direction. In a non-limiting embodiment, for example, the stalk 15 may be made from a rounded, hollow semi-rigid fiber that is folded to form the plications 23 to provide the accordion-like structure. The plications 23 within the stalk 15 may be substantially parallel to the filtering layer 14 when the stalk 15 is not bent or expanded. The plications 23 of the stalk 15 improve the overall fit of the mask 10 with respect to different sized and shaped faces and decrease the need for a professional "mask fitting" where a mask is customized for a particular user. In a non-limiting embodiment, the plications 23 of the stalk 15, in combination with the plications 21 of the filtering layer 14, work together to provide increased fit, function, and comfort.

In a non-limiting example, the dimensions of the mask 10, which is designed to fit most faces, may have a side to side (cheek-to-cheek) width of approximately 15 cm in the horizontal direction when worn by a user and a height of 12 cm in the vertical direction (ridge of the nose to the chin). In a position where the stalk 15 is collapsed as shown in FIG. 2A, a depth 31 of the mask 10 may be, for example, 2 cm or less from a central portion of the filtering layer 14 to a bottom of an adhesive pad 16. FIG. 2B shows the face mask 10 with the stalk 15 in an extended position. In the extended position, the depth may become up to 5 cm or more, as shown by the distance 41 in FIG. 2B. A primary aspect involved in adding to this depth 41 in the extended form is the stalk 15. The mask 10 may therefore have a bowed shape that increases the breathing space for the user especially in a fully extended position. As expected, the concavity will be toward the user's face and the convexity will be toward the outside.

A method of manufacturing a strapless facemask according to a non-limiting embodiment includes folding a filtering medium several times to form plications. With reference to FIGS. 1-5, the filtering medium may be made of a material that has suitable filtering capabilities, such as those described above for the filtering layer 14. The filtering medium is cut into desired dimensions to form the filtering layer 14 having the plications 21. A force is applied to a center area of the filtering layer 14 to induce a slight bowing shape. The first end 24 of the stalk 15 is fixed to an inner surface 26 of the filtering layer 14, and the second end 25 of the stalk is fixed the adhesive pad 16. The aforementioned parts of the mask 10 may be fixed to each other using, for example, a sewing operation, a pressing and sealing operation, and/or an adhesive or the like.

As will be apparent to one of ordinary skill in the art from a reading of this disclosure, the present disclosure can be embodied in forms other than those specifically disclosed above. The particular embodiments described above are, therefore, to be considered as illustrative and not restrictive. Those skilled in the art will recognize, or be able to ascertain, using no more than routine experimentation, numerous equivalents to the specific embodiments described herein. The scope of the invention is as set forth in the appended claims and equivalents thereof, rather than being limited to the examples contained in the foregoing description.

The invention claimed is:

1. A strapless facemask comprising:

a mask body including an inner surface and an outer surface, wherein the inner surface is configured to face a user's face, wherein the mask body is made of a filtering material;

a flexible stalk disposed along a peripheral portion of the inner surface of the mask body to circumscribe the inner surface of the mask body, a first end of the stalk being coupled to the inner surface of the mask body, wherein the stalk extends in a first direction away from the inner surface to a second end, and the stalk is configured to be adjustable to multiple positions including a first position where the stalk maintains the mask body away from the user's face at a first distance and a second position where the stalk maintains the mask body away from the user's face at a second distance, the second distance being greater than the first distance; and an adhesive pad coupled to the second end of the stalk.

2. The strapless facemask of claim 1, wherein the first end of the stalk is directly connected to the inner surface of the mask body.

3. The strapless facemask of claim 1, wherein the first end of the stalk is integral with the inner surface of the mask body.

4. The strapless facemask of claim 1, wherein the second end of the stalk is directly connected to the adhesive pad.

5. The strapless facemask of claim 1, wherein the second end of the stalk is integral with the adhesive pad.

6. The strapless facemask of claim 1, wherein the adhesive pad has a width greater than a width of the stalk in a direction perpendicular to the first direction.

7. The strapless facemask of claim 1, wherein the adhesive pad has microplications formed of peaks and troughs, and wherein the microplications are configured to face the user's face.

8. The strapless facemask of claim 7, wherein the microplications extend in radial directions perpendicular to a perimeter of the mask.

9. The strapless facemask of claim 1, wherein the stalk has a corrugated shape.

10. The strapless facemask of claim 1, wherein the stalk is made of a material that is permeable to gas to provide a filtering function.

11. The strapless facemask of claim 10, wherein the gas comprises air.

12. The strapless facemask of claim 10, wherein the gas comprises carbon dioxide.

13. The strapless facemask of claim 1, wherein the stalk is flexible to allow the mask body to move when the facemask is worn by a user.

14. The strapless facemask of claim 1, wherein the stalk is configured to act as an adjustable spacer to distance the mask body from a user's face.

15. The strapless facemask of claim 1, wherein the mask body includes plications.

16. The strapless facemask of claim 15, wherein the plications extend horizontally.

17. The strapless facemask of claim 15, wherein the plications extend vertically.

18. The strapless facemask of claim 1, wherein the mask body comprises N95 material.

19. The strapless facemask of claim 1, wherein the mask body comprises a bilayer surgical fiber.

20. The strapless facemask of claim 1, wherein the mask body has a bowed shape when the mask is in a fully expanded position, wherein the bowed shape comprises a concavity toward the user's face.

21. The strapless facemask of claim 1, comprising an appendage attached to the outer surface of the mask body, the appendage being graspable by a user for adjusting a position of the mask body.

22. The strapless facemask of claim 21, wherein the appendage is sewn to the outer surface of the mask body.

23. The strapless facemask of claim 21, wherein the appendage is integral with the outer surface of the mask body.

24. The strapless facemask of claim 1, wherein the stalk includes multiple expandable and contractable hollow segments.

25. The strapless facemask of claim 24, wherein the adhesive pad has a width greater than a width of the stalk.

* * * * *